United States Patent [19]
Joffe

[11] Patent Number: 5,331,861
[45] Date of Patent: Jul. 26, 1994

[54] ROTATING DRIVE MAGNETICALLY COUPLED FOR PRODUCING LINEAR MOTION

[76] Inventor: Benjamin Joffe, 22314 James Alan Cir., Chatsworth, Calif. 91311

[21] Appl. No.: 952,471

[22] Filed: Sep. 28, 1992

Related U.S. Application Data

[63] Continuation of Ser. No. 532,743, Jun. 4, 1990, abandoned.

[51] Int. Cl.⁵ .................................. F16H 25/20
[52] U.S. Cl. ........................ 74/89.15; 74/424.8 R; 74/441; 384/446
[58] Field of Search ............... 74/89.15, 424.8 R, 441; 384/446

[56] References Cited

U.S. PATENT DOCUMENTS

| | | | |
|---|---|---|---|
| 3,011,842 | 12/1961 | Norris | 384/446 |
| 3,016,274 | 1/1962 | Norris | 384/446 |
| 3,974,706 | 8/1976 | Danko, Jr. | 74/89.15 |
| 4,131,029 | 12/1978 | Harbaugh et al. | 74/89.15 |
| 4,372,223 | 2/1983 | Iwatani | 74/89.15 X |
| 4,597,303 | 7/1986 | Nakaya | 74/89.15 |
| 4,779,473 | 10/1988 | Grady et al. | 74/424.8 R X |

Primary Examiner—Richard M. Lorence
Attorney, Agent, or Firm—Ashen & Lippman

[57] ABSTRACT

A rotatable drive mechanism for producing linear motion of an object includes driving and driven members, one of which is elongated, and which act cooperatively through frictional engagement to produce longitudinal motion of the driven member. It also includes a magnetic coupling having at least first and second magnetizable members with mutually facing flat annular surfaces, a set of balls disposed in a generally annular arrangement between those flat surfaces, and magnetic means attracting the magnetizable members to each other. Respective ends of the magnetic coupling are fixedly secured to the driven member and to the object, respectively. Since the elements of the magnetic coupling, in and of themselves, would permit relative rotation of parts, which is undesired, provision is also made for restraining the undesired rotation of any part of the magnetic coupling. In a particular embodiment a second magnetic coupling, without balls between magnetizable members, is also used in opposing relation to the first coupling.

21 Claims, 10 Drawing Sheets

ROTATING DRIVE MAGNETICALLY COUPLED FOR PRODUCING LINEAR MOTION

This is a continuation of copending application Ser. No. 07/532,743 filed on Jun. 4, 1990 now abandoned.

BACKGROUND OF THE INVENTION

In various applications it is necessary to repetitively produce linear movements. Both precision and wear factors are very important. One type of mechanism that is widely used converts rotary motion into longitudinal, reciprocating motion. For example, the lead screw has been known and used for this purpose for many decades.

In more recent times, the conventional lead screw is often replaced by a ball screw, in which balls positioned between a screw member and a ball housing provide rolling friction in lieu of the pure sliding friction that would result from the operation of the conventional lead screw. Another mechanism for converting rotary motion into linear motion of a reciprocating nature is known as the linear friction driver.

In both of those devices there is a problem which adversely affects operating precision. The problem is that the lead screw—or an equivalent elongated drive member, the shaft of a linear friction driver—experiences lateral deflection at one or more points along its length, thus producing a wobbling or vibrating action during its rotation. The wobble or vibration, in turn, causes small but significant errors in the work process being performed.

PRIOR ART

Pertinent prior art includes the following U.S. patents:
Cunningham, U.S. Pat. No. 2,916,931
Bourne, U.S. Pat. No. 3,001,414
Norris, U.S. Pat. No. 3,011,842
Norris, U.S. Pat. No. 3,016,274
Paine (NASA), U.S. Pat. No. 3,660,704
Hoshina et al, U.S. Pat. No. 3,777,587
Stegeman et al, U.S. Pat. No. 3,824,420
Imahashi, U.S. Pat. No. 4,347,452
U.S. Pat. No. 4,487,087

The Norris patents disclose magnetic bearings. The other prior patents show devices for eliminating or reducing backlash in machine drives, and also show magnetic controls of various kinds used in conjunction with machinery.

SUMMARY OF THE INVENTION

According to the invention the wobbling action of an elongated drive member is permitted to continue, but its adverse effects upon a work piece are substantially eliminated. A magnetic coupling is inserted longitudinally within the drive train and absorbs the lateral deflections of the drive source, but transmits longitudinal movements in a reliable and precise manner.

More specifically, a rotatable drive mechanism for converting rotating motion to linear motion includes two drive members—one of which is elongated—and which are frictionally interengaged such that driven rotation of either of them causes one to move relative to the other; and fixed support means mounting one member for rotation relative to the fixed support while restraining the other member against rotation. An object or work piece which is to be driven is mounted for slidable motion longitudinally of the elongated drive member.

Magnetic means are employed to couple the driven member to the object or work piece. The magnetic coupling means include a first magnetizable member having a substantially flat annular surface, a second magnetizable member having a substantially flat annular surface positioned substantially parallel to the surface of the first magnetizable member, and a set of balls disposed between the annular surfaces of the two magnetizable members in a generally annular arrangement. The two magnetizable members are secured to respective ones of the drive members.

The two magnetizable members are drawn together by magnetic force, as for example by magnetization of either member or both, to capture and forcibly constrain the balls, with respect to longitudinal motion, between the two members. With respect to transverse motion, however, the balls are free for transverse rolling movements in response to transverse relative displacements of said annular surfaces.

Accordingly the first and second magnetizable members forcibly transmit longitudinal motion from the drive means through the balls to the object. Yet the two members are free for transverse relative displacements because such displacements are accommodated (without the slightest loss of longitudinal engagement) by the transverse rolling motion of the balls.

As a consequence, forcible transmission of longitudinal motion from the drive means through the balls is substantially unaffected by lateral wobbling or vibration of the elongated drive member.

What is more, the magnetic force can be made strong enough to maintain the two members forcibly engaged even during reversals of the mechanism. During such reversals, conventional systems are subject to an objectionable operating dead zone, sometimes called "backlash", because of a need to take up the slack or play between elements before the mechanism can drive in the opposite direction. Here, there never is slack or play to be taken up.

Furthermore all these advantageous properties persist even in the face of extensive wear, because the magnetic attraction continues, independent of lateral offset, after the parts are worn.

According to a second embodiment of the invention the magnetic coupling includes first, second, and third magnetizable members. The first and second members have a first pair of opposing annular surfaces between which a first set of balls is disposed in a generally annular arrangement. The second and third members have a second pair of opposing annular surfaces between which a second set of balls is disposed in a generally annular arrangement. The first and third magnetizable members are secured to respective ones of the drive members. At least one of the three magnetizable members is magnetized.

There are a number of significant modifications of the invention. According to one of the modifications the mating surfaces of two magnetizable members each have the shape of a truncated sphere, thereby introducing additional degrees of freedom within the drive train that are spherically symmetrical, and which are used to reduce the effect of any twisting movements upon the accurate transmission of axial movement.

DRAWING SUMMARY

Figure 3A:
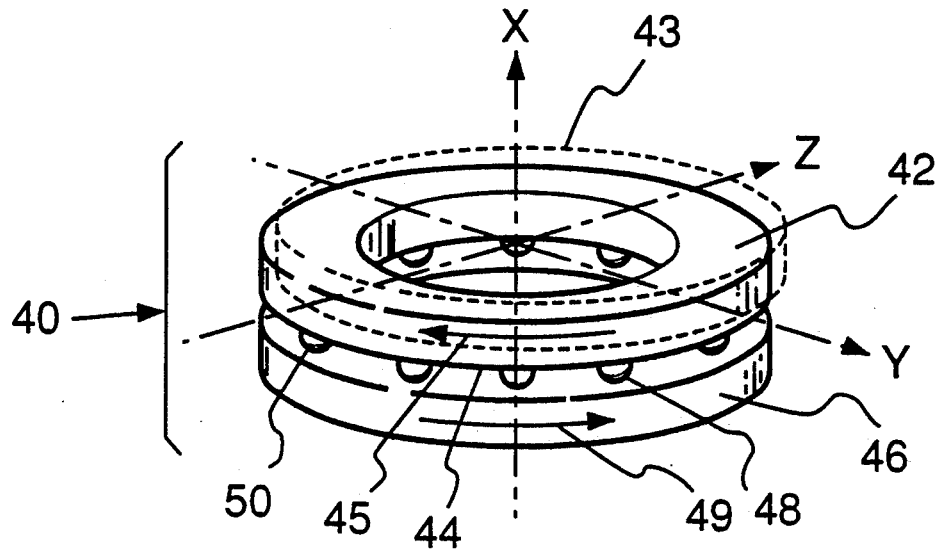
Figure 3B:
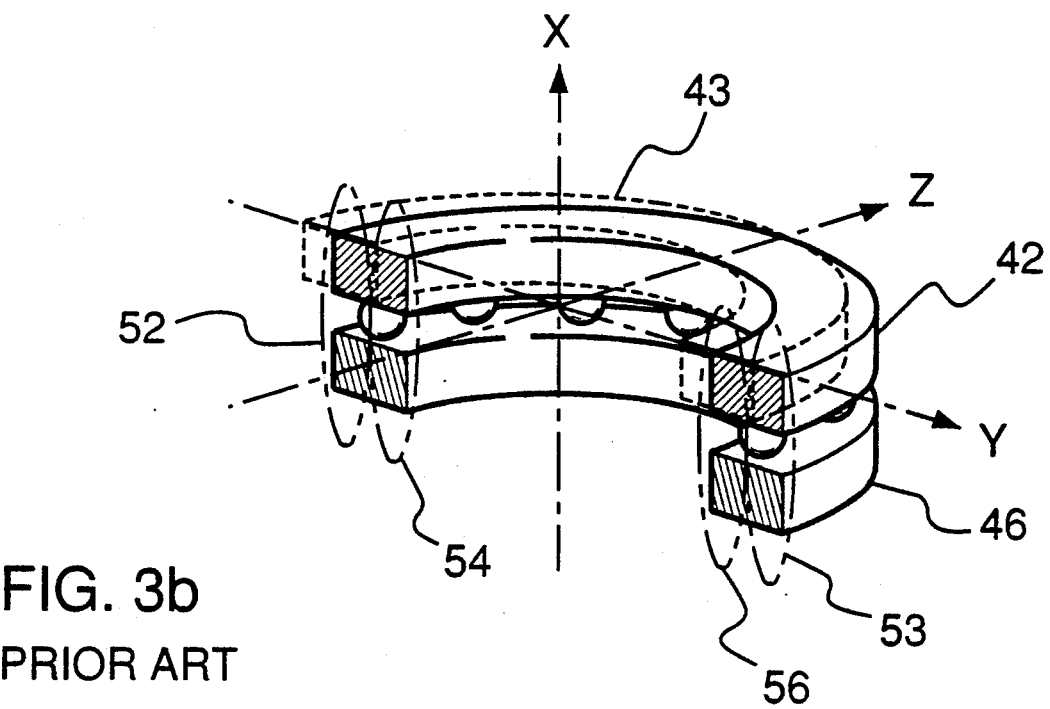
Figure 4:
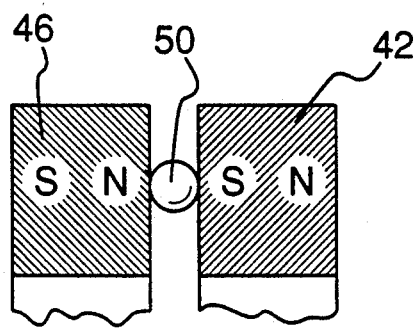

FIGS. 3a, 3b, and 4 show a type of magnetic thrust bearing which is known in the prior art, and which in accordance with the present invention is used as a coupling to accommodate movements in the Y and Z directions. FIG. 3a is a perspective view, FIG. 3b is a cross-sectional view, and FIG. 4 is a schematic fragmentary view which shows magnetic polarizations of the coupling members.

Figure 5:
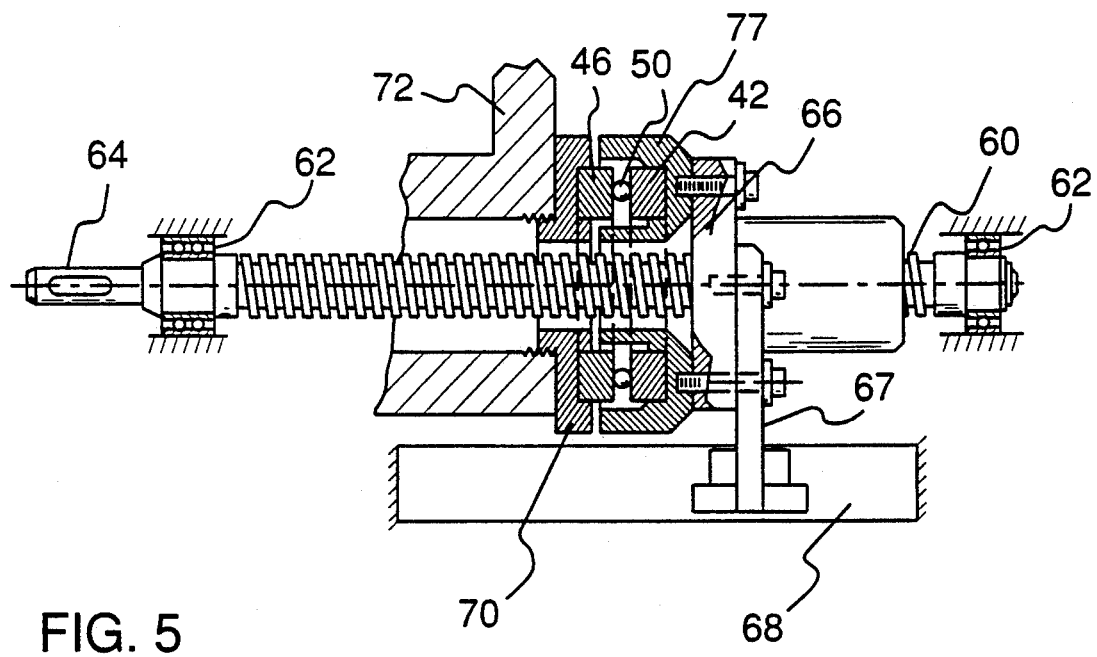

FIG. 5 is a side elevation view, partly in cross-section, of a longitudinal drive apparatus in accordance with a first embodiment of the present invention in which a lead screw rotatably drives a slidably movable object through a magnetic coupling.

Figure 6:
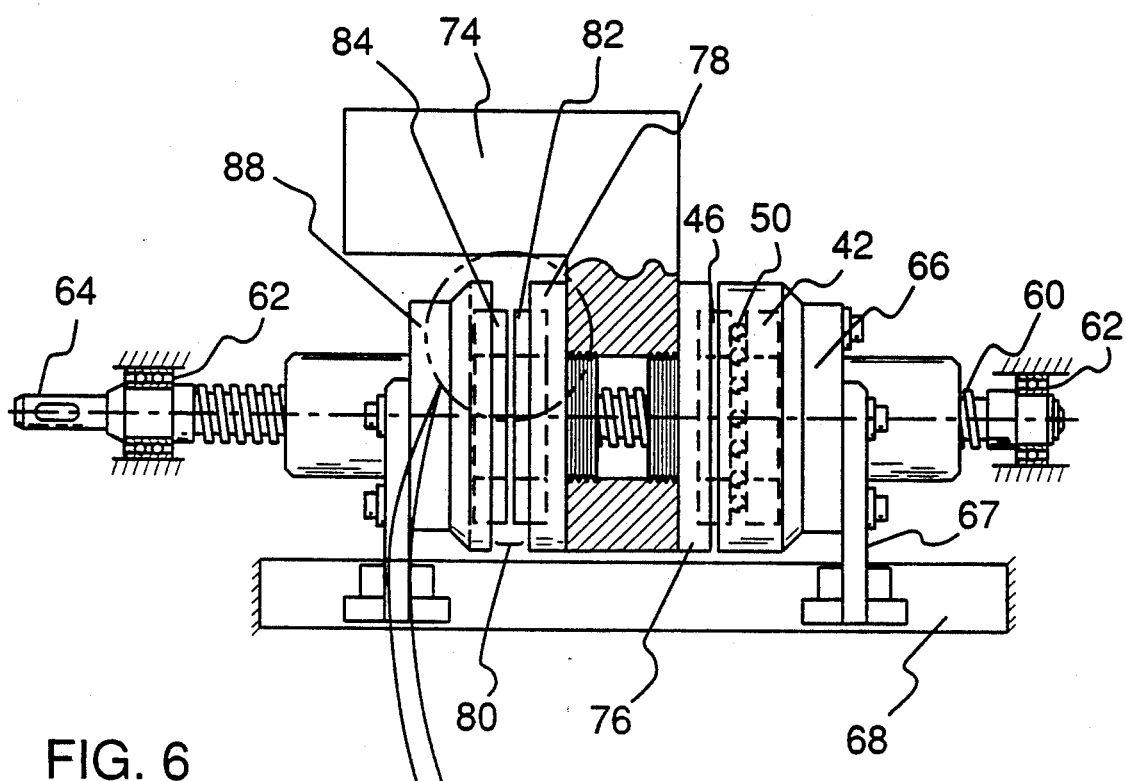

FIG. 6 is a side elevation view, partly in cross-section, of a modified version of the longitudinal drive apparatus of FIG. 5 in which an additional and different magnetic coupling is used to achieve an anti-backlash action and help to move the object.

Figure 7:
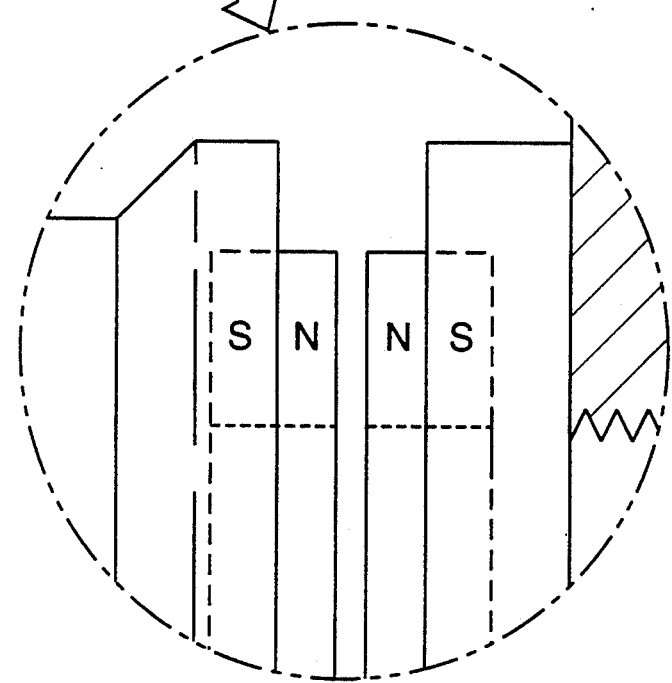

FIG. 7 is a fragmentary schematic view showing the magnetic polarizations of the magnetizable members of the anti-backlash coupling of FIG. 6.

Figure 8:
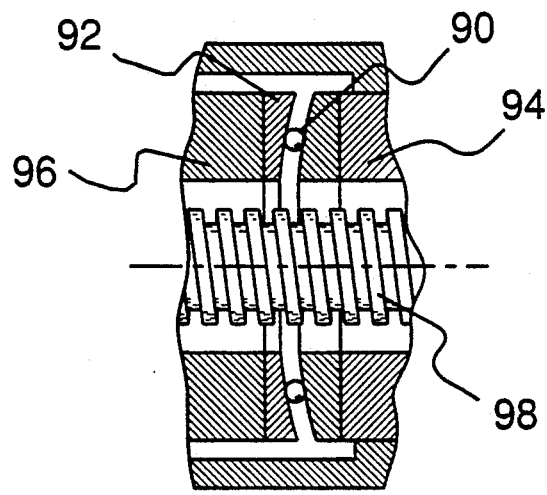

FIG. 8 is a fragmentary cross-sectional view of a modified magnetic coupling in which two magnetizable members have mating dish-shaped surfaces.

Figure 9:
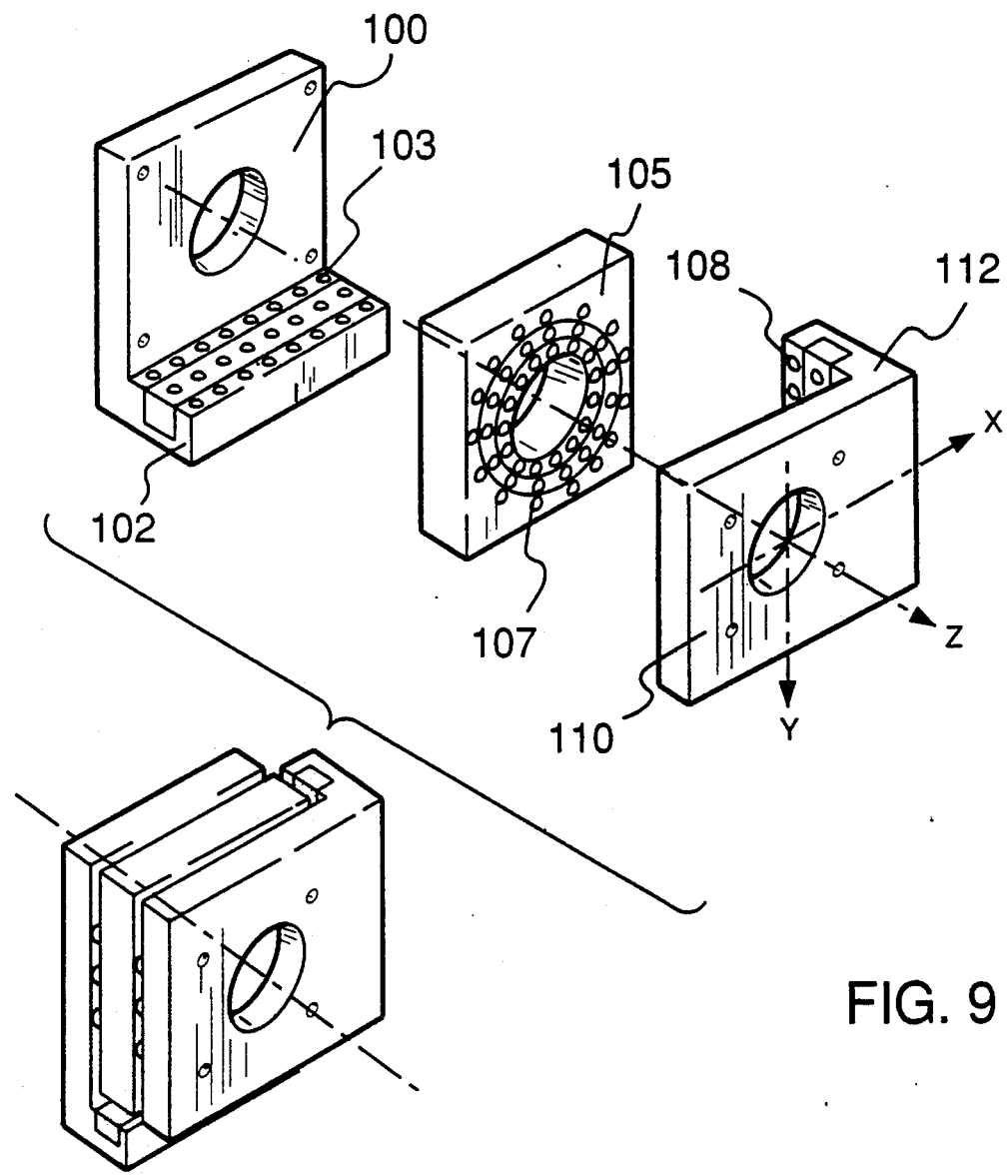

FIG. 9 is an exploded perspective view of a magnetic coupling in which three magnetizable members are utilized, the members being in the form of rectangular plates with interlocking flanges.

Figure 10:
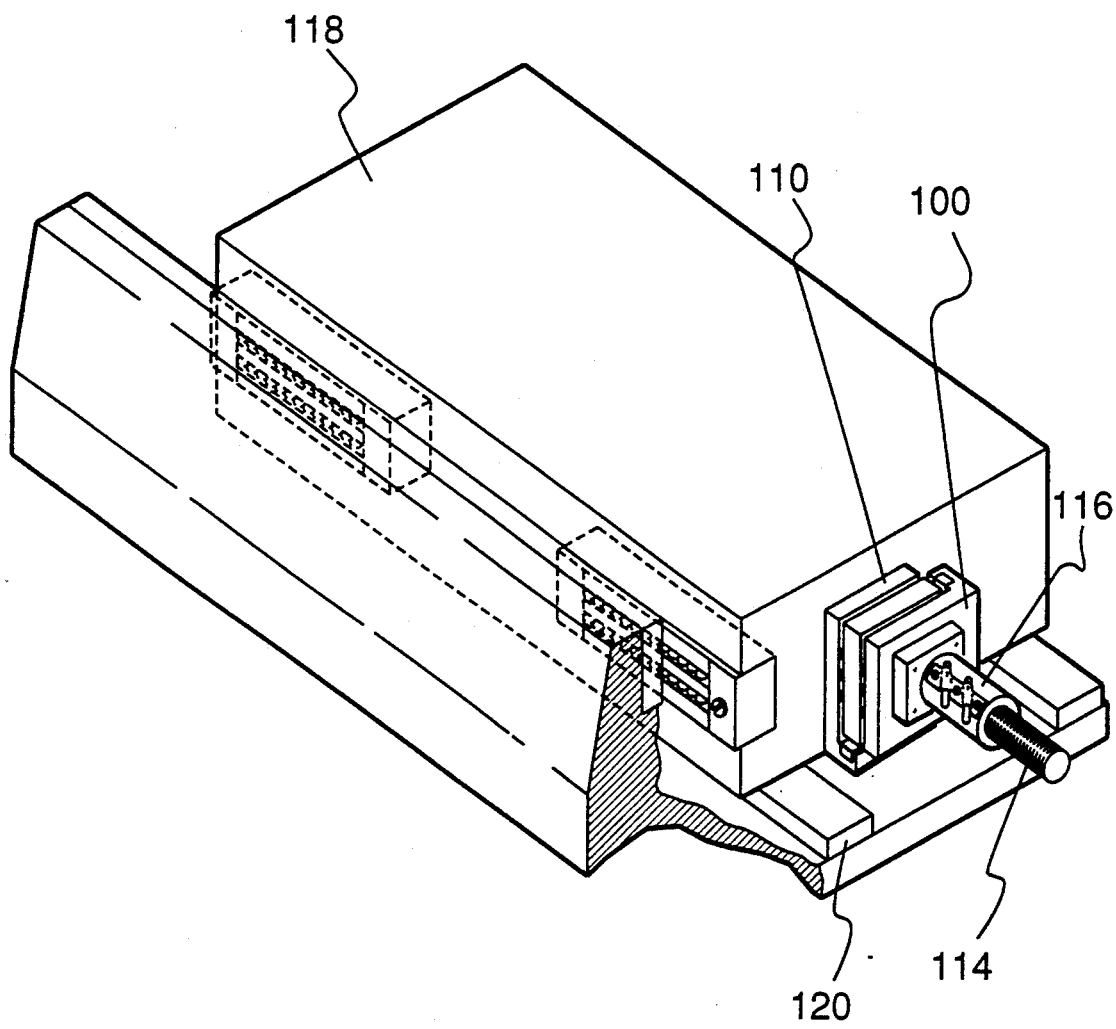

FIG. 10 is a perspective view of a longitudinal drive apparatus in which the magnetic coupling of FIG. 9 is incorporated.

Figure 11:
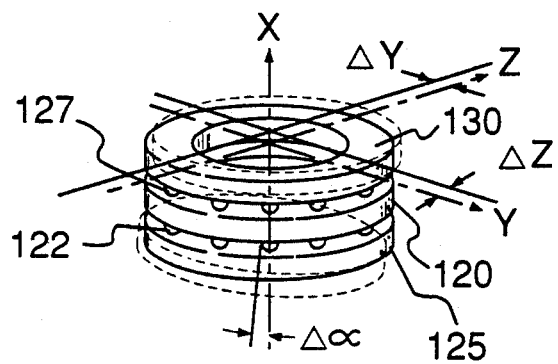

FIG. 11 is a perspective view of another modified form of magnetic coupling utilizing three ring-shaped magnetizable members.

Figure 12A:
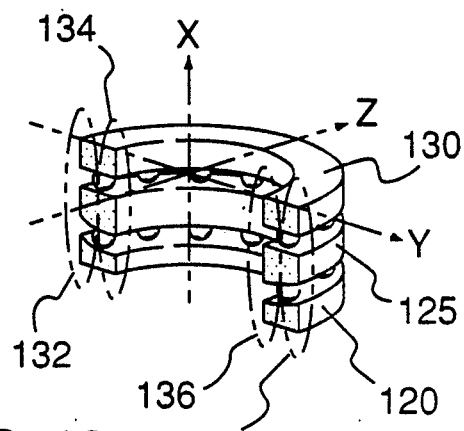

FIG. 12a is a cross-sectional view of the coupling of FIG. 11.

Figure 12B:
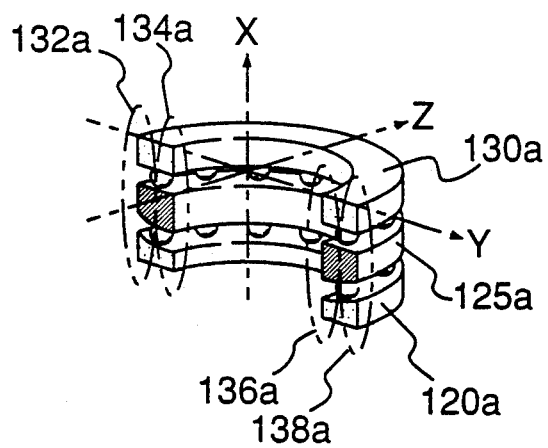

FIG. 12b is a cross-sectional view of a modified form of the coupling of FIG. 11.

Figure 12C:
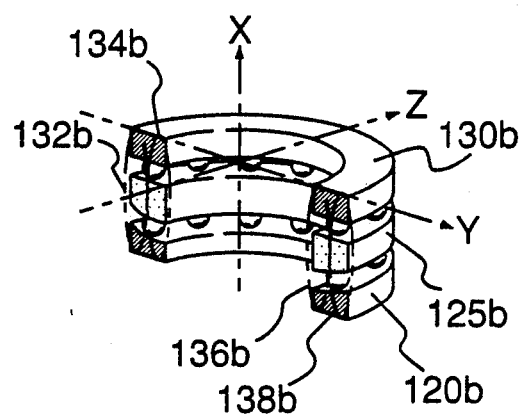

FIG. 12c is a cross-sectional view of another modified form of the coupling of FIG. 11.

Figure 13:
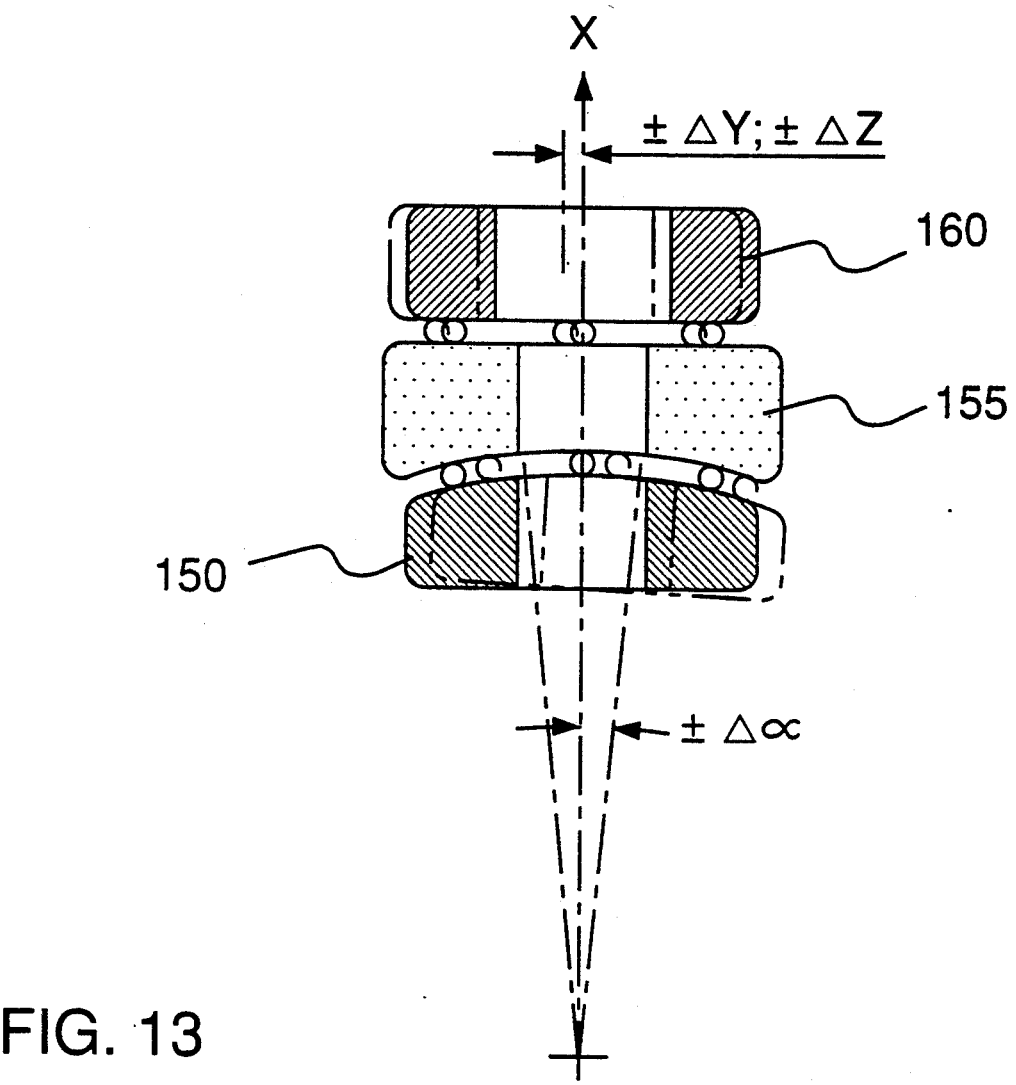

FIG. 13 is a cross-sectional view of still another modified form of magnetic coupling utilizing three magnetizable members, and in which the mating surfaces of two of the magnetizable members each have the shape of a truncated sphere.

Figure 14:
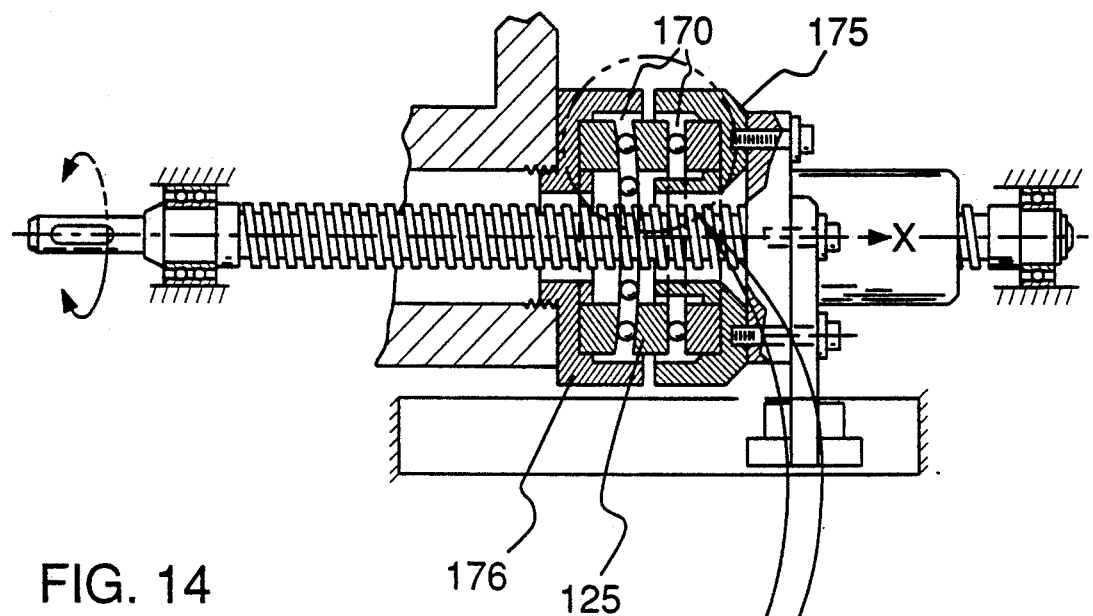

FIG. 14 is a side elevation view, partly in cross-section, of another longitudinal drive apparatus which incorporates the magnetic coupling of FIG. 11.

Figure 15:
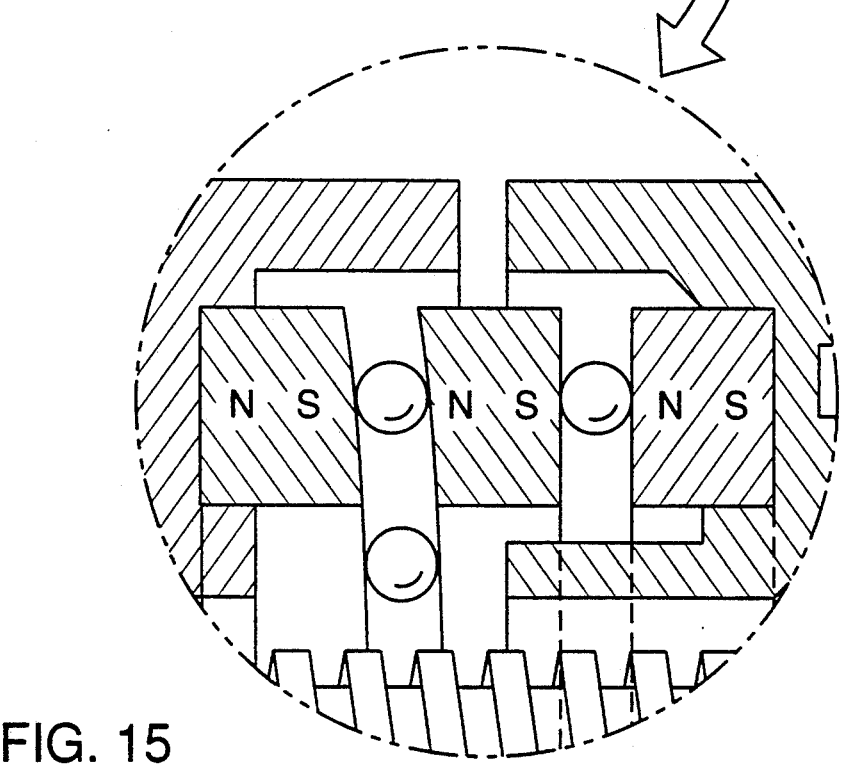

FIG. 15 is a schematic fragmentary view showing the magnetic polarizations of the magnetizable members of FIG. 14.

Figure 16:
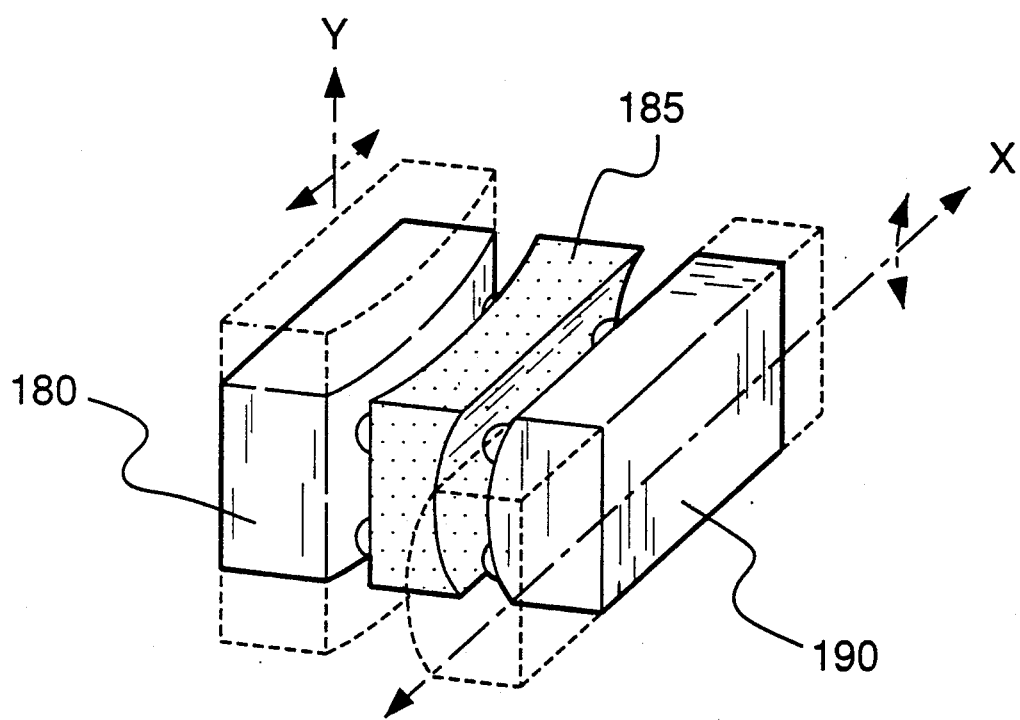

FIG. 16 is a perspective view of a three-part magnetic coupling in which both pairs of magnetizable members have opposed surfaces which are curved, and their curvatures are relative to axes that are mutually perpendicular.

DESCRIPTION OF PRIOR ART

Figure 1:
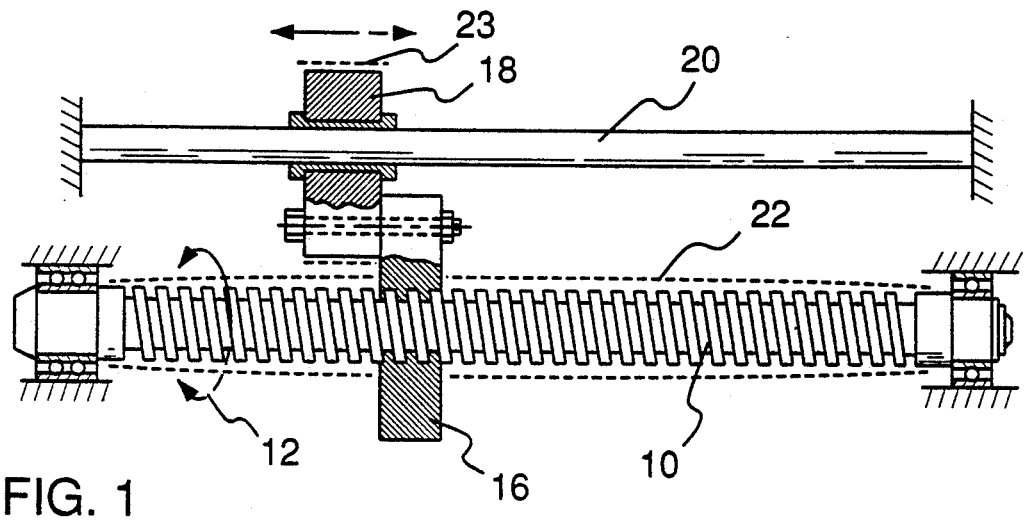
FIG. 1 is a side elevation view, partly in cross-section, showing a prior art type of conventional lead screw which is rotatably driven and has a nut secured against rotation to a slidably movable object or work piece.

As shown in FIG. 1, a conventional lead screw set-up includes a lead screw 10 having fixed end supports, not shown, driven in rotation as shown by an arrow 12. A nut 16 is threadedly supported on the lead screw and drivingly attached to a work piece or other object 18 which is slidably supported on a slide 20 for movement longitudinally of the lead screw, which prevents nut 16 from rotating. Because the lead screw has both substantial length and substantial weight it is subject to lateral deflection as shown by dotted lines 22. The resulting wobble or vibration of the lead screw introduces small but significant errors 23 into the positioning of the work piece 18.

Another source of error in the mechanism of FIG. 1 arises from backlash. As is well known, that problem may be minimized by employing an additional drive coupling (not shown in FIG. 1) which resiliently opposes the linear driving force that is applied to the work piece by the nut 16.

Figure 2:
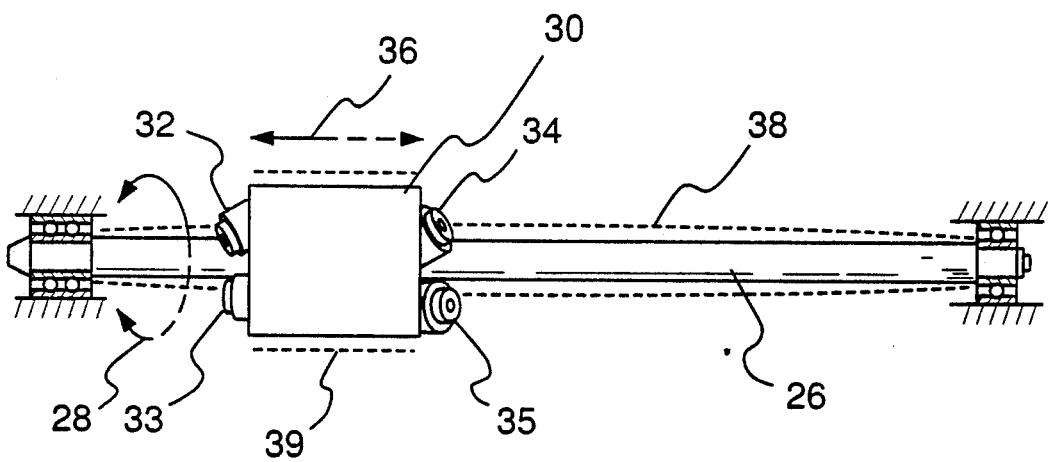
FIG. 2 shows a prior art linear actuator including a smooth elongated shaft and angled rollers which achieve a driving action by surface friction.

FIG. 2 shows a linear actuator in accordance with the prior art, including a smooth elongated shaft 26 which is driven in rotation as shown by arrow 28. A roller housing 30 is supported by angled rollers 32, 33, 34, 35 which frictionally engage the shaft 26. The operation is very similar to that of the conventional lead screw; that is, rotation of either the shaft or the housing will drive the other in longitudinal motion, as indicated by arrow 36. Lines 38 indicate that wobble occurring in the shaft 26 creates an error 39 in the housing position.

FIG. 3a illustrates a magnetic thrust bearing of a type which has been previously disclosed in U.S. Pat. No. 3,011,842 to Norris. The bearing 40 includes a first ring-shaped magnetic member 42 having an inner surface 44 and a second ring-shaped magnetic member 46 having an inner surface 48. The two magnetic members are arranged such that their inner surfaces are in generally parallel relationship, and balls 50 are positioned between the two surfaces and aligned in an annular configuration. Balls 50 are made of magnetic material. An arrow 45 indicates that the first or upper ring 42 may rotate in a circular path in a clockwise direction as viewed from above, and an arrow 49 indicates that the second or lower ring 46 may rotate in the opposite direction.

The magnetic members 42, 46, are not only magnetizable, but are in fact permanent magnetic. As shown in FIG. 3b, lines of magnetic flux 52, 54, 56, 58 extend through various balls in a direction perpendicular to the circular path of movement of the balls, and loop upon themselves both outside and inside the ring-shaped members. As indicated in FIG. 4 the adjacent surfaces of the rings 42, 46 are oppositely polarized, one being of north polarity and the other south. The magnetic attraction therefore retains the balls in their annular or circular pattern, and at the same time holds the rings 42, 46 in tight engagement with the balls.

In this invention in all of the proposed magnetic couplings the balls can be made of nonmagnetic materials. The balls can also be made of ferromagnetic materials.

For the purposes of the present invention letters X, Y, and Z have been placed on FIG. 3a. X indicates the axial direction in which thrust may be transmitted through the bearing 40. Y and Z indicate lateral or radial directions which are perpendicular to the axial direction and to each other, and these axes are pertinent when the bearing 40 is used as a magnetic coupling means in accordance with the present invention. Dotted lines 43 indicate an alternate position of member 42 in which it is laterally offset in both the Z and the Y directions.

DESCRIPTION OF FIRST EMBODIMENT
(FIGS. 5, 6, 7, and 8)

FIG. 5 illustrates a longitudinal drive apparatus in accordance with a first embodiment of the invention. The bearing 40 of FIGS. 3 and 4 is utilized as a coupling means. As shown in FIG. 5 a lead screw 60 has fixed end supports 62 and is rotatably driven through shaft end 64. A nut 66 engages the threads of lead screw 60. While a conventional nut is shown, in lieu thereof it may be preferred to utilize the well known ball nut assembly which includes a ball housing disposed about the lead screw but not in direct contact with it, and a plurality of balls retained within the ball housing and engaging a longitudinal section of the screw thread.

A frame 67 is fixedly attached to the near side of the nut 66 and extends downward to and rests upon a horizontal slide 68, for holding the nut against rotation. The slide then guides the nut in a direction that is longitudinal of the lead screw 60. First magnetic member 42 and second magnetic member 46 capture balls 50 therebetween. A work piece holder 70 is fixedly supported from the second magnetic member 46 and in turn provides fixed support to the movable object through the work piece 72.

The work piece 72 preferably is slidably supported upon a horizontal slide, not shown, for guiding it in a direction longitudinal of the lead screw 60.

In operation, the rotation of lead screw 60 driven by the shaft end 64 causes the nut 66 to advance longitudinally of the lead screw. Nut 66 is to some extent supported and guided by the frame 67 which rides upon the horizontal slide 68; perhaps more importantly, however, the frame 67 and slide 68 prevent the nut from rotating, so that it must advance longitudinally of the lead screw. Magnetizable member 42 is fixedly attached through the work piece 77 to the nut 66 and moves with it.

Any lateral deflection or wobble of the shaft 60, therefore, is imparted to the member 42. The work piece 72 is supported upon its separate slide such as the slide 20 of FIG. 1, and it is therefore almost entirely shielded from the deflections of the magnetizable member 42 in Z and Y directions, and angular movement. That is to say, member 42 moves laterally with respect to member 46 while still transmitting the full amount of axial thrust to it. What is important is that in the movement there is no damage to the ball nut assembly because all undesired motion is corrected by the magnetic coupling.

It is important to note that control of the movable object may be lost if the force required to move it is greater than the magnetic force between the components in the magnetic coupling. Success can be achieved by choosing magnets having sufficient force, or alternatively, by utilizing two magnetic couplings as shown in FIG. 6.

The apparatus of FIG. 6 is essentially the same as that of FIG. 5, with the addition of a second magnetic coupling. Thus, lead screw 60, end supports 62, shaft end 64, first nut 66, frame 67, horizontal slide 68, magnetizable members 42 and 46, and balls 50, are the same as in FIG. 5. A work piece or other object 74 is supported in part from the magnetizable member 46 by means of a holder 76. On its opposite end, taken longitudinally of the lead screw 60, the work piece 74 is fixedly attached to a second holder 78. A second magnetic coupling 80 provides axial support for the holder 78. The magnetic coupling 80 includes a first magnetizable member 82 and a second magnetizable member 84 with opposite vector of magnetic field in the direction of the movement of the magnetizable members. The members 82 and 84 are separated by a short axial space 86, but there are no balls between the members 82 and 84. Member 82 is fixedly attached to the second holder 78. Member 84 is fixedly attached to a second nut 88 which engages the lead screw 60. The size of the gap 86 needs to be a little greater than the magnitude of the wobbling action that is to be eliminated.

The magnetizable members 82, 84, are in fact permanent magnets. As shown in FIG. 7, the adjacent surfaces of the members 82, 84, are of like magnetic polarity, so that they repel each other. This action causes the interengaged threads of nut 66 and lead screw 60 to be constantly biased in one axial direction, a technique which is well known for anti-backlash devices. The biasing force is produced by the magnetic field between the two magnets 82, 84, and is resilient in nature. Thus, the second magnetic coupling has two separate functions: to always push the movable object toward nut No. 1 and the first magnetic coupling; and holding both the first nut 66 and the second nut 88 with zero backlash relative to the lead screw.

FIG. 8 shows a magnetic coupling in accordance with a further modification of the invention, in which two magnetizable members have mating dish-shaped surfaces. A first magnetizable member 90 is ring-shaped and has a convex surface facing toward the concave surface of second magnetizable member 92. A drive member 94 is fixedly secured to member 90 and a drive member 96 is fixedly secured to member 92. Both of the magnetizable members 90, 92, are radially spaced from a lead screw 98 which is drivingly coupled to one of the drive members 94, 96, by means not specifically shown.

The mechanism of FIG. 8 has significant advantages. Axial drive is effectively transmitted, and the influence of any twisting movements that occur in the drive train is greatly reduced.

DESCRIPTION OF SECOND EMBODIMENT
(FIGS. 9 through 16)

FIG. 9 illustrates a magnetic coupling which includes three magnetizable members 100, 105, and 110, each in the form of a rectangular plate having a central opening through which a lead screw may pass. Member 100 on one of its edges has a perpendicular flange 102. Member 110 on one of its edges has a perpendicular flange 112. In their assembled relation a first set of balls 103 is positioned between the flange 102 of member 100 and a side edge of member 105; a second set of balls (not shown) is positioned between opposing flat surfaces of members 100 and 105; a third set of balls 107 is positioned between opposing flat surfaces of members 105 and 110; and a fourth set of balls 108 is positioned between the flange 112 of member 110 and a side edge of member 105. As shown in FIG. 10 the members 100 and 110 then fit on opposite sides of member 105 and have their flanges positioned at right angles to each other. FIG. 10 shows a lead screw 114 passing through the central openings of the members 100, 105, 110, and a ball nut 116 engaging the lead screw and fixedly attached to member 100. A housing 118 is slidably reciprocably mounted on a support, for example machine table 120; the housing 118 is fixedly attached to the coupling member 110. The interlocking flanges 102, 112 are attached through balls to the coupling part 105. This coupling design then prevents rotation of the driving member 100 that is attached to the ball nut.

FIGS. 11 and 12a show another modification in accordance with the invention. A magnetic coupling includes three ring-shaped magnetizable members 120, 125, 130. A first set of balls 122 is positioned between the members 120, 125, and a second set 127 is positioned between members 125, 130. As best seen in FIG. 12a, the upper surface of member 120 is concave while the lower surface of member 125 is convex. Their curvatures are preferably such as to conform to partial spherical surfaces.

FIG. 12a also indicates that all three of the members 120, 125, 130 are made of magnetizable material and are, in fact, magnetized as permanent magnets. Accordingly, magnetic fields are generated as indicated by the flux lines 132, 134, 136, and 138. All of these flux lines pass through the annular arrays of balls 122, 127. It will therefore be understood that the members 120, 125, 130, and associated sets of balls, are strongly held together in the direction of desired motion—i.e. the axial direction, by the force of the magnetic fields.

FIG. 12b shows a modified form of the magnetic coupling of FIG. 11. As indicated by that drawing, the central member 125a is made of a steel alloy, a material with high magnetic permeability, while members 120, 130 are permanent magnets as before. The magnetic field pattern is essentially the same as for the FIG. 12a apparatus.

FIG. 12c shows a further modified form of the magnetic coupling of FIG. 11. The central member 125 is a permanent magnet as before, while members 120a, 130a are made of a steel alloy material. There is a substantial change in the magnetic field pattern, and the flux lines 142, 144, 146, and 148 are of much smaller scope than the corresponding flux lines as shown in FIG. 12a. In all of the magnetic coupling designs the balls can be made of nonmagnetic materials.

FIG. 13 illustrates another modification of magnetic couplings in accordance with the present invention. The coupling includes ring-shaped magnetic members 150, 155, and 160. Member 150 has a convex upper surface while member 155 has a convex lower surface. The upper surface of member 155 is flat and the mating lower surface of member 160 is also flat. The central member 155 is magnetized as a permanent magnet while the outer members 150, 160, are not. As shown in the drawing the diameter of the central member 155 is significantly greater than the diameter of the other two members. As a preferred range, its diameter is from 1.2 to 1.5 times the diameter of the two outer members. This feature of the construction permits a significant twisting action relative to the longitudinal axis of the drive train, but with a reduced amount of force in the Y and Z—or lateral—directions to be transmitted to the driven member.

FIGS. 14 and 15 illustrate a longitudinal drive apparatus which is similar to that shown in FIG. 5, an important difference being that the magnetic coupling 170 is of the type shown in FIGS. 11 and 12a. Also, the magnetic members are substantially enclosed by a pair of shrouds 175, 176, which are made of magnetic material and therefore provide paths of decreased magnetic reluctance for the flux lines such as 132, 134, 136, 138. There is a short length of the central magnetic member 125 which is not covered by either shroud. Shroud 175 covers member 130 and a part of member 125, while shroud 176 covers member 120 and a part of member 125. An advantage of this arrangement is that the magnetic coupling is stronger, and at the same time there is less magnetic field strength to be sensed outside the apparatus itself.

FIG. 16 shows a further modification of the magnetic coupling of the present invention. It includes outer plates 180, 190, a central or inner plate 185, and two sets of balls, one on each side of the inner plate. The mating surfaces between the inner plate and one end plate are curved in the form of a partial cylinder about an axis that is perpendicular to the axis of the coupling. The mating surfaces between the inner plate and the other end plate are also curved in the form of a partial cylinder about an axis that is perpendicular to the axis of the coupling and its axis of curvature is perpendicular to the first axis of curvature. The embodiment of FIG. 16, like all previous embodiments, minimizes wear of the apparatus as well as providing high precision operation, over a relatively greater range of motion.

It will be apparent to those skilled in the art that many other modifications may be made by combining various ones of the features illustrated herein, and there are also modifications which will be evident from the described concepts of the invention.

The invention has been disclosed in detail in order to comply with the requirements of the patent laws. The scope of the invention, however, is to be measured only in accordance with the appended claims.

I claim:

1. A rotatable drive mechanism for producing linear motion of an object, while minimizing the effects of undesired lateral movements of the drive mechanism itself, comprising:

(a) means for converting rotating motion to linear motion, including an elongated drive member and a cooperating structure disposed laterally to said elongated drive member which frictionally engages said elongated drive member such that driven rotation of either of them causes one to move relative to the other in a direction longitudinally of said drive member;

(b) fixed support means mounting a first one of said elongated drive member and said cooperating structure for rotation relative thereto, and also mounting the object for longitudinal slidable motion relative to said fixed support means in a direction longitudinally of said elongated drive member;

(c) drive means adapted to drive said first one of said drive member and said cooperating structure in rotation relative to said fixed support means;

(d) means restraining the other one of said elongated drive member and said cooperating structure against rotation relative to said fixed support; and (e) magnetic means coupling said first one of said drive member and said cooperating structure to the object, including:

(1) a first magnetizable member fixedly secured to said first one and having a substantially flat annular surface which lies in a plane substantially perpendicular to the longitudinal axis of said elongated drive member, (2) a second magnetizable member fixedly secured to the object and having a substantially flat annular surface which faces toward the first magnetizable member and which lies in a plane substantially parallel to the plane of the flat annular surface of the first magnetizable member, and (3) a set of balls disposed in a generally annular arrangement between the annular surfaces of said two magnetizable members; and (f) means for establishing magnetic attraction between the first and second magnetizable members, to forcibly draw the magnetizable members toward one another and forcibly capture the balls longitudinally between the two annular surfaces and cause the balls to be:

with respect to longitudinal movement, forcibly constrained by said surfaces, and with respect to transverse movement, free for transverse rolling movements in response to transverse relative displacements of said surfaces;

wherein said first and second magnetizable members:

forcibly transmit longitudinal motion from the drive means through the balls to the object, and are decoupled with respect to transverse relative displacements, which displacements are accommodated by said transverse rolling motion of the balls;

whereby said forcible transmission of longitudinal motion through the balls is substantially unaffected by lateral movements which may result from wobbling or vibration of said elongated drive member.

2. The mechanism of claim 1, wherein:

at least one of the magnetizable members is magnetized.

3. The mechanism of claim 1, wherein:

said magnetic-attraction means maintain said forcible capture of the balls between the magnetizable members, and said decoupling with respect to transverse relative displacements, even after wear in the coupling means; and said magnetic-attraction means apply force sufficient to hold the two magnetizable members firmly together even during reversal of the drive, and substantially regardless of wear;

whereby backlash within the magnetic-coupling means is substantially eliminated, independently with respect to wear in the mechanism.

4. The apparatus of claim 1 wherein said driven one is said elongated drive member.

5. A rotatable drive mechanism for producing linear motion of an object while minimizing the effects of undesired lateral movements of the drive mechanism itself, comprising:

(a) means for converting rotating motion to linear motion, including a drive structure and an elongated driven member, said drive structure frictionally engaging said elongated driven member and adapted when driven to move said elongated driven member longitudinally;

(b) fixed support means mounting said drive structure for rotation relative thereto, and also mounting the object for longitudinal slidable motion relative to said drive structure;

(c) magnetic means coupling said drive structure to the object, including:

(1) a first magnetizable member fixedly secured to said elongated driven member and having a substantially flat annular surface and which lies in a plane substantially perpendicular to the longitudinal axis of said elongated drive member, (2) a second magnetizable member fixedly secured to the object and having a substantially flat annular surface which faces toward and lies in a plane substantially parallel to the flat annular surface of the first magnetizable member, and (3) a set of balls disposed in a generally annular arrangement between the annular surfaces of said two magnetizable members; and (d) means restraining said elongated driven member against rotation relative to said drive structure; and (e) means for establishing magnetic attraction between the first and second magnetizable members, to forcibly draw the magnetizable members toward one another and forcibly capture the balls longitudinally between the two annular surfaces and cause the balls to be:

with respect to longitudinal movement, forcibly constrained by said surfaces, and with respect to transverse movement, free for transverse rolling movements in response to transverse relative displacements of said surfaces;

wherein said first and second magnetizable members of the apparatus;

forcibly transmit longitudinal motion from the drive means through the balls to the object, and are decoupled with respect to transverse relative displacements, which displacements are accommodated by said transverse rolling motion of the balls;

whereby said forcible transmission of longitudinal motion through the balls is substantially unaffected by lateral movements which may result from wobbling or vibration of said elongated driven member.

6. The mechanism of claim 9, wherein:

said magnetic-attraction means maintain said forcible capture of the balls between the magnetizable members, and said decoupling with respect to transverse relative displacements, even after wear in the coupling means; and said magnetic-attraction means apply force sufficient to hold the two magnetizable members firmly together even during reversal of the drive, and substantially regardless of wear;

whereby backlash within the magnetic-attraction means is substantially eliminated, independently with respect to wear in the mechanism.

7. The apparatus of claim 6, further comprising:

means for enhancing isolation of the object from transverse displacements;

wherein said enhancing means comprise the material of said ball members, which are made of magnetizable material that concentrates magnetic flux developed by both magnetizable members to strengthen the forcible capture of the balls between the magnetizable members;

whereby said magnetizable material enhances said isolation by strengthening the forcible capture of the balls between the magnetizable members.

8. The mechanism of claim 5, wherein: at least one of said magnetizable members is magnetized.

9. The apparatus of claim 8, further comprising:

means for enhancing isolation of the object from transverse displacements;

wherein said enhancing means comprise the material of said ball members, which are made of magnetizable material that concentrates magnetic flux developed by said at least one magnetizable member to strengthen the forcible capture of the balls between the magnetizable members;

whereby said magnetizable material enhances said isolation by strengthening the forcible capture of the balls between the magnetizable members.

10. A rotatable drive mechanism for producing linear motion of an object while minimizing the effects of undesired lateral movements of the drive mechanism itself, comprising:
   (a) means for converting rotating motion to linear motion, including a drive structure and an elongated driven member, said drive structure frictionally engaging said elongated driven member and adapted when driven to move said elongated driven member longitudinally;
   (b) fixed support means mounting said drive structure for rotation relative thereto, and also mounting the object for longitudinal slidable motion relative to said drive structure;
   (c) magnetic means coupling said drive structure to the object, including:
      (1) a first magnetizable member fixedly secured to said elongated driven member and having a substantially flat annular surface which lies in a plane perpendicular to the longitudinal axis of said elongated drive member,
      (2) a second magnetizable member fixedly secured to the object and having a substantially flat annular surface facing away from the object and which lies in a plane perpendicular to the direction of longitudinal slidable motion of the object, and
      (3) a set of balls made of unmagnetizable material disposed in a generally annular arrangement between the annular surfaces of said two magnetizable members; and
   (d) means restraining said elongated driven member against rotation relative to said drive structure;
   at least one of said magnetizable members being magnetized whereby said balls in conjunction with said first and second magnetizable members reliably transmit longitudinal motion to the object substantially unaffected by lateral movements which may result from wobbling or vibration of said elongated driven member.

11. The apparatus of claim 10 wherein both of said magnetizable members are magnetized.

12. A rotatable drive mechanism for producing linear motion of an object while minimizing the effects of undesired lateral movements of the drive mechanism itself, comprising:
   (a) means for converting rotating motion to linear motion, including a drive structure and an elongated driven member, said drive structure frictionally engaging said elongated driven member and adapted when driven to move said elongated driven member longitudinally;
   (b) fixed support means mounting said drive structure for rotation relative thereto, and also mounting the object for longitudinal slidable motion relative to said drive structure;
   (c) magnetic means coupling said drive structure to the object, including:
      (1) a first magnetizable member fixedly secured to said elongated driven member and having a substantially flat annular surface which lies in a plane perpendicular to the longitudinal axis of said elongated drive member,
      (2) a second magnetizable member having a substantially flat annular surface facing away from the object and which lies in a plane substantially perpendicular to the direction of longitudinal slidable motion of the object,
      (3) a first set of balls disposed in a generally angular arrangement between the annular surfaces of said first and second magnetizable members,
      (4) a third magnetizable member fixedly secured to the object and having a substantially flat annular surface facing away from the object and which lies in a plane perpendicular to the direction of longitudinal slidable motion of the object, said second magnetizable member also having a flat annular surface facing toward the object, and
      (5) a second set of balls disposed in a generally annular arrangement between the annular surfaces of said second and third magnetizable members; and
   (d) means restraining said elongated driven member against rotation relative to said drive structure;
   at least one of said magnetizable members being magnetized whereby said balls in conjunction with said magnetizable members reliably transmit longitudinal motion to the object substantially unaffected by lateral movement which may result from wobbling or vibration of said elongated driven member.

13. The apparatus of claim 12 wherein said ball members are made of unmagnetizable material.

14. The apparatus of claim 12 wherein said first and third magnetizable members are magnetized.

15. The apparatus of claim 14 wherein said ball members are made of unmagnetizable material.

16. The apparatus of claim 14 wherein said ball members are made of magnetizable material.

17. The apparatus of claim 12 wherein said ball members are made of magnetizable material.

18. A rotatable drive mechanism for producing linear motion of an object, comprising:
   driving and driven members, one of which is elongated, and which through frictional engagement cooperatively produce longitudinal motion of the driven member when the driving member operates;
   a magnetic coupling including at least first and second magnetizable members having mutually facing flat annular surfaces, a set of balls disposed in a generally annular arrangement between said flat surfaces, and magnetic means attracting said magnetizable members to each other to forcibly clamp the balls therebetween and eliminate longitudinal play between the surfaces while accommodating lateral displacements between the driving and driven members by transverse rolling motion of the balls between the surfaces;
   means fixedly securing respective ends of said magnetic coupling to said driven member and to the object, respectively; and
   means for restraining undesired rotation of any part of said magnetic coupling.

19. The mechanism of claim 16, wherein:
   the magnetic means apply force sufficient to hold the two magnetizable members firmly together even during reversal of the drive, and regardless of wear;

whereby backlash within the magnetic coupling is substantially eliminated, independently with respect to wear in the coupling.

20. A rotatable drive mechanism for producing linear motion of an object, comprising:

driving and driven members, one of which is elongated, and which through frictional engagement cooperatively produce longitudinal motion of the driven member when the driving member operates;

a magnetic coupling including at least first and second magnetizable members having mutually facing flat annular surfaces, a set of balls disposed in a generally annular arrangement between said flat surfaces, and magnetic means biasing said magnetizable members toward each other by attractive force;

means fixedly securing respective ends of said magnetic coupling to said driven member and to the object, respectively;

means for restraining undesired rotation of any part of said magnetic coupling;

an additional magnetic coupling that includes third and fourth magnetizable members and that is engaged with one of the first and second magnetizable members to bias the first and second magnetizable members toward each other more forcibly; and means causing said third and fourth magnetizable members to repel each other.

21. The apparatus of claim 1 wherein the balls in the magnetic coupling can also be made from nonmagnetic materials such as ceramic.

* * * * *